United States Patent
Schmieder et al.

(10) Patent No.: US 9,695,955 B2
(45) Date of Patent: Jul. 4, 2017

(54) VALVE FOR METERING FLUID

(71) Applicant: Robert Bosch GmbH, Stuttgart (DE)

(72) Inventors: Dietmar Schmieder, Markgroeningen (DE); Tilo Landenfeld, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 14/246,470

(22) Filed: Apr. 7, 2014

(65) Prior Publication Data

US 2014/0306136 A1 Oct. 16, 2014

(30) Foreign Application Priority Data

Apr. 11, 2013 (DE) .......................... 10 2013 206 385

(51) Int. Cl.
*F16K 31/06* (2006.01)
*F02M 51/06* (2006.01)
(Continued)

(52) U.S. Cl.
CPC ..... *F16K 31/0668* (2013.01); *F02M 51/0671* (2013.01); *F02M 61/08* (2013.01);
(Continued)

(58) Field of Classification Search
CPC ............ F16K 31/0668; F02M 51/0671; F02M 61/08; F02M 61/205; F02M 61/168; F02M 2200/26; F02M 2200/50
(Continued)

(56) References Cited

U.S. PATENT DOCUMENTS 4,917,352 A * 4/1990 Hauet ................. F02M 51/066
123/472
5,046,472 A * 9/1991 Linder ................. F02M 51/061
123/533
(Continued)

FOREIGN PATENT DOCUMENTS

DE 102007004870 8/2008
DE 102009028234 2/2011
EP 2 366 888 9/2011

OTHER PUBLICATIONS

Machine Translation of DE102007004870 A1 with publication date of Aug. 7, 2008; accessed Aug. 22, 2015.*
(Continued)

*Primary Examiner* — Craig Schneider
*Assistant Examiner* — Andrew J Rost
(74) *Attorney, Agent, or Firm* — Norton Rose Fulbright US LLP; Gerard Messina

(57) ABSTRACT

A valve for metering fluid under pressure includes: a valve housing having an inlet opening and a metering opening for the fluid; an outward-opening valve needle pressure equalized via an elastic hollow body which is subject to the fluid pressure; and an electromagnet which lifts the valve needle up from the metering opening against the force of a valve closing spring. The valve housing is assembled from a valve tube and one valve body on the metering end and another on the inlet end, each being connected in a fluid-tight manner to the valve tube at the tube ends. The magnet pot including the enclosed solenoid coil is secured on the valve tube on the outside by the electromagnet, and the magnetic core is secured on the valve tube on the inside in such a way that it surrounds a needle section of the valve needle.

6 Claims, 1 Drawing Sheet

(51) Int. Cl.
*F02M 61/08* (2006.01)
*F02M 61/16* (2006.01)
*F02M 61/20* (2006.01)

(52) U.S. Cl.
CPC ........ *F02M 61/168* (2013.01); *F02M 61/205* (2013.01); *F02M 2200/26* (2013.01); *F02M 2200/50* (2013.01)

(58) Field of Classification Search
USPC ......... 251/129.07, 129.21; 239/585.5, 585.4, 239/585.1, 584
See application file for complete search history.

(56) References Cited

U.S. PATENT DOCUMENTS

| | | | | |
|---|---|---|---|---|
| 6,484,700 | B1* | 11/2002 | Kimmel | F02M 51/0682 123/531 |
| 6,755,360 | B1* | 6/2004 | Anderson | F02M 51/0671 239/533.7 |
| 7,309,032 | B2* | 12/2007 | Fischer | F02M 51/0603 239/102.1 |
| 7,546,961 | B2* | 6/2009 | Cristiani | F02M 51/0671 239/456 |
| 2002/0056768 | A1* | 5/2002 | Czimmek | F02M 51/0603 239/585.1 |

OTHER PUBLICATIONS

Machine Translation of DE102009028234 with publication date of Feb. 17, 2011; accessed Aug. 22, 2015.*

* cited by examiner

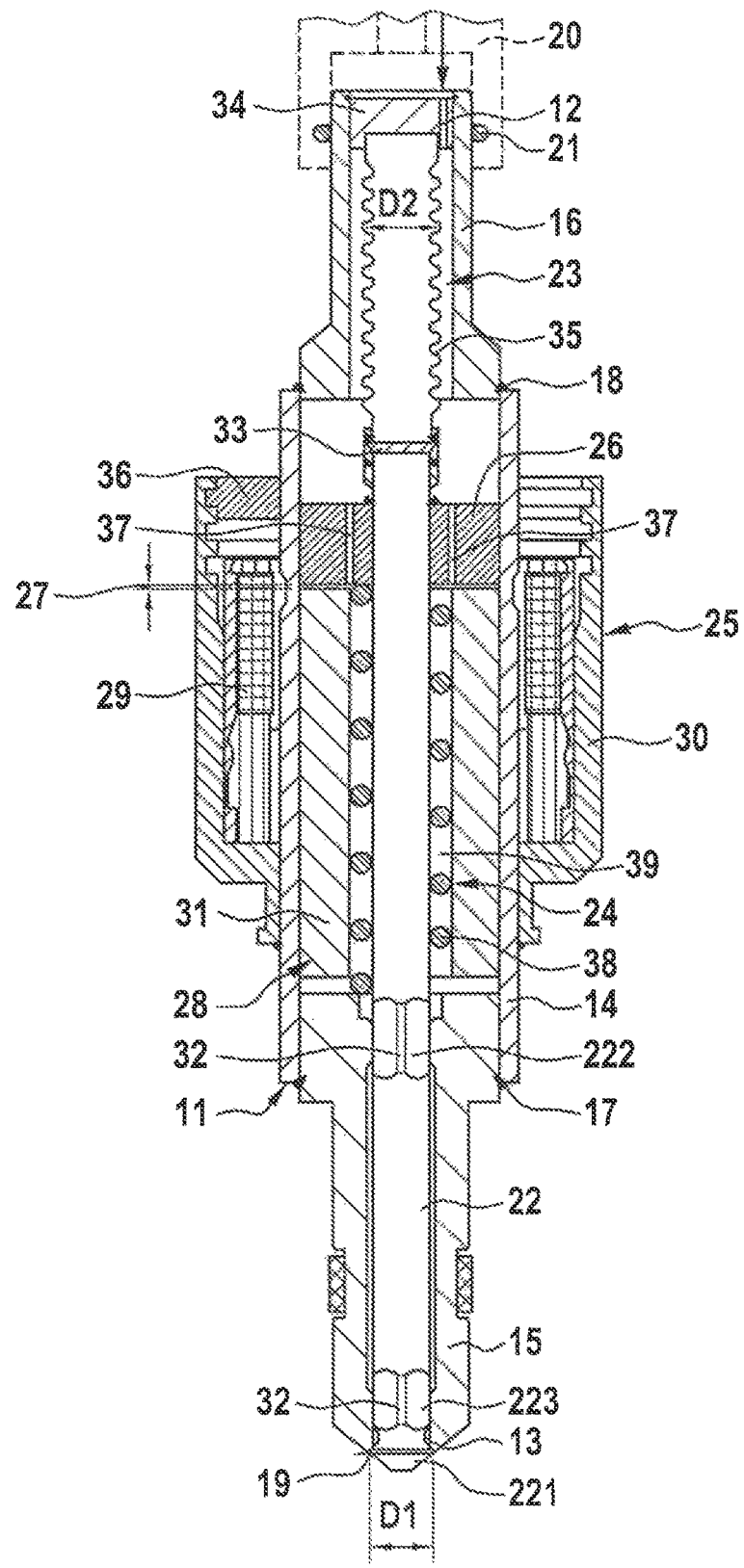

VALVE FOR METERING FLUID

BACKGROUND OF THE INVENTION

1. Field of the Invention

The present invention relates to a valve for metering fluid, the umbrella term "fluid" referring to a flowing medium, for both gases and liquids in accordance with fluid dynamics.

2. Description of the Related Art

In a known, so-called outward-opening injector (Published European patent application document EP 2 366 888 A1), the valve housing has a hollow cylindrical nozzle body including a valve seat surrounding the nozzle opening situated at one end, a housing pot with the nozzle body protruding centrally through its pot bottom into the housing pot and a housing cap which seals the housing pot and has a cap jacket and cap bottom, an inlet connection for the fluid being situated in the cap jacket. Inside the housing pot, a solenoid coil of an electromagnet sits on the nozzle body. A ring plate made of a nonmagnetic material is connected to the magnet pot and the nozzle body in a fluid-tight manner in each case and, together with the pot bottom of the housing pot, encloses an encapsulated coil space in which the solenoid coil is situated and, together with the housing cap, encloses a fluid-filled valve space into which the nozzle body protrudes. A valve needle is guided axially displaceably in the nozzle body and carries a closing head cooperating with the valve seat on one end. There is an annular clearance between the valve needle and the cylinder wall of the nozzle body through which the fluid flows from the valve space to the metering opening. A magnet armature of the electromagnet attached to the valve needle delimits a working air gap of the electromagnet with the end face of the nozzle body protruding out of the coil space. A valve-closing spring designed as a disk spring is supported between the magnet armature and the ring plate, exerting on the magnet armature a force which applies the closing head to the valve seat via the valve needle. A folded or corrugated bellows arrangement, having a folded or corrugated bellows tightly connected to the valve needle and the cap bottom and having a calibration spring situated in the folded or corrugated bellows, extends between the end of the valve needle remote from the closing head and the cap bottom of the housing cap in the valve space. The calibration spring is supported on the needle end of the valve needle on the one hand and on an axially adjustable adjusting bolt in the cap bottom on the other hand. The calibration spring may be prestressed in the desired way by displacement of the adjusting bolt and acts upon the valve needle with a compressive force acting in the valve opening direction. The diameter of the valve seat and the hydraulic diameter of the folded or corrugated bellows are the same, so that the valve needle is pressure equalized for all fluid pressures, and the dynamic response of the valve is independent of the fluid pressure.

BRIEF SUMMARY OF THE INVENTION

The valve according to the present invention has the advantage that an outward-opening valve for metering fluid, controlled by an electromagnetic actuator, is implemented in a cost-saving and advantageous compact design from the manufacturing standpoint. The composition of the valve housing requires only easy-to-machine parts. The valve tube may therefore be deep drawn and the two valve bodies may be machined. The integral bond of the valve bodies to the valve tube creates a fluid-tight valve space for accommodation of valve components. The displacement of the valve closing spring, designed as a compression spring, into the interior of the magnetic core and the inclusion of the elastic hollow body in the valve body on the inlet end, which is at the same time formed as a connecting piece to be inserted into a connecting cup of a fluid supply line reduces the axial length of the valve and the design height of a fluid metering or injection system, which has in particular multiple valves connected to the fluid supply line. The fluid pressure acting on the closing head in the valve opening direction is approximately compensated for by the elastic hollow body containing a gas filling or a vacuum, regardless of any variable fluid pressures. The closing force of the compression spring may therefore be reduced, and the compression spring may be designed to be smaller. A minor valve closing force reduces the compressive force of the electromagnet required to open the valve, so that it is possible to use a less efficient and therefore smaller electromagnet. All of this supports the goal of a small valve design.

According to one advantageous specific embodiment of the present invention, the compression spring is designed as a helical compression spring or as a Bourdon spring. Exemplary embodiments of such a Bourdon spring are described in published German patent application document DE 103 19 599 A1.

According to one advantageous specific embodiment of the present invention, the elastic hollow body, preferably a metallic folded or corrugated bellows made of stainless steel, is sealed tightly at one end by an adapter attached to the valve needle and a closure element secured in a fluid-tight manner in the valve body on the inlet end. A vacuum or a filling in the form of a gas of a low thermal expansion is present in the hollow body. The inlet opening of the valve in the closure element is implemented with the aid of a through-hole, so that the fluid flowing into it via the through-hole acts upon the elastic hollow body over its entire axial length. Since the hydraulic diameter of the hollow body and the diameter of the valve seat are approximately the same, the valve needle is always approximately under equalized pressure conditions, regardless of the varying fluid pressures.

BRIEF DESCRIPTION OF THE DRAWING

The FIGURE shows a longitudinal section through an exemplary embodiment of a valve for metering fluid.

DETAILED DESCRIPTION OF THE INVENTION

The valve shown in a sectional view in the drawing for metering of fluid under pressure is inserted into the combustion chamber of an internal combustion engine or into an intake channel leading to the combustion chamber of the internal combustion engine for injection of fuel. However, it may also be used as an injection valve for metering of gas volumes in gas engines.

The valve has a valve housing 11 having an inlet opening 12 for supplying fluid and a metering opening 13 for metered spraying of fluid. Valve housing 11 is assembled from a valve tube 14, a hollow valve body 15 on the metering end connected in a fluid-tight manner to valve tube 14 on its tube end and a hollow valve body 16 on the inlet end, also connected in a fluid-tight manner to valve tube 14 on its other end. The fluid-tight connection is established with the aid of an integral bond, for example, by peripheral welds 17, 18.

Metering opening 13 and a valve seat 19 surrounding metering opening 13 and having a seat surface pointing outward in the spray direction are formed at the end in valve body 15 on the metering end. Valve body 16 on the inlet end has inlet opening 12. It is molded to form a connecting piece, which is inserted into a connecting cup 20, indicated with dashed lines, of a so-called rail, i.e., a feeder line for the fluid, and is sealed there with the aid of a sealing ring 21. The valve has a thin, elongated valve needle 22, which is provided with a closing head 221 and is pressure equalized with the aid of an elastic hollow body 23, which is exposed to the fluid pressure and is connected to valve needle 22 by an elastic hollow body on the end of valve needle 22 remote from the closing head. The term "pressure equalized" as used here means that the compressive force of the fluid acting on closing head 221 in the opening direction is compensated approximately by the tensile force created by hollow body 23 on valve needle 22 under the influence of the fluid pressure. Elastic hollow body 23 is aligned coaxially with valve needle 22 and is accommodated in valve body 16 on the inlet end. A valve closing spring 24, which places closing head 221 on valve seat 19, engages on valve needle 22. An electromagnet 25 is used to lift closing head 221 from valve seat 19 against the closing force of valve closing spring 24. Electromagnet 25 has a magnet armature 26, including axial channels 37 for the fluid passage, connected to valve needle 22, an internal pole 28 enclosing a working air gap 27 with magnet armature 26, a solenoid coil 29 and a magnet pot 30 enclosing solenoid coil 29. Magnet pot 30 is secured externally on valve tube 14 using a pot section of a smaller diameter and is coupled to valve tube 14 via a ferromagnetic return path yoke 36 located at its pot opening. Internal pole 28 is formed by a hollow cylindrical magnetic core 31, which is secured internally on valve tube 14 and surrounds a needle section of valve needle 22. Valve closing spring 24 is designed as a compression spring, for example, as a cylindrical helical compression spring 38 or as a Bourdon spring situated in annular space 37 present between magnetic core 31 and valve needle 22, surrounding the needle section of valve needle 22 concentrically in magnetic core 31 supported on valve body 15 on the metering end and on magnet armature 26. Valve needle 22 is guided axially displaceably by two sliding sections 222, 223 in valve body 16 on the metering end. Sliding sections 222, 223 are provided with axial grooves 35 for the passage of the fluid.

Elastic hollow body 23, which is aligned coaxially with valve needle 22 and is preferably designed as a metallic folded or corrugated bellows 35, is hermetically sealed at one end by an adapter 33 and at the other end by a closure element 34 and is filled with a gas having a low thermal expansion or a vacuum. Adapter 33 is secured on the end of valve needle 22 remotely from the closing head, and closure element 34 is inserted in a fluid-tight manner into the end section of valve body 16 on the inlet end facing away from valve tube 14. Inlet opening 12 in the form of an axial through-bore is introduced into closure element 34. The tight connection of adapter 33 and closure element 34 to metallic folded or corrugated bellows 35 is again accomplished with the aid of an integral bond. Likewise, the connection of adapter 33 to valve needle 22 and closure element 34 to valve body 16 on the inlet end are established with the aid of an integral bond. Elastic hollow body 23 has a hydraulic diameter D2, which is at least approximately equal to diameter D1 of valve seat 19. Hydraulic diameter D2 is understood here to be a diameter on which the fluid under pressure acts over the entire axial length of elastic hollow body 23 or folded or corrugated bellows 35. The pressure of the fluid on the folded or corrugated bellows 35 is converted by folded or corrugated bellows 35 into a tensile force acting on the end of valve needle 22 remotely from the closing head, this tensile force being applied to closing head 221 against valve seat 19.

What is claimed is:

1. A valve for metering fluid under pressure, comprising:
    a valve housing having an inlet opening for supplying fluid and a metering opening for spraying the fluid;
    a valve seat formed on the valve housing and surrounding the metering opening, the valve seat including a seat surface pointing in a spray direction;
    a valve needle carrying a closing head and being pressure equalized via an elastic hollow body which is subject to the fluid pressure and is connected to the valve needle on an end of the valve needle remote from the closing head;
    a valve closing spring which engages on the valve needle, applying the closing head to the valve seat; and
    an electromagnet which applies a compressive force to the valve needle, lifting the closing head outward away from the valve seat, the electromagnet having a magnet armature connected to the valve needle, an internal pole which encloses a working air gap together with the magnet armature, a solenoid coil and a magnet pot enclosing the solenoid coil;
    wherein the valve housing has; a valve tube; a first hollow valve body portion on the metering end; connected in a fluid-tight manner to the valve tube on one tube end, the valve seat and the metering opening being formed in the first hollow valve body portion on the metering end, and wherein the valve needle is slidingly guided in the first hollow valve body portion; and a second hollow valve body portion connected in a fluid-tight manner to the valve tube at a second end, the inlet opening being formed in the second hollow valve body portion and the elastic hollow body being accommodated in the second hollow valve body portion;
    wherein the magnet pot and the solenoid coil being secured on the valve tube on the outside, the inside pole is formed by a hollow cylindrical magnetic core, which is secured on the valve tube on the inside, surrounding a needle section of the valve needle, and the valve closing spring is a compression spring situated in an annular space between the magnetic core and the needle section of the valve needle enclosed by the magnetic core, and the compression spring is supported on the first hollow valve body portion on the metering end and on the magnet armature,
    wherein the elastic hollow body is sealed at one end by an adapter attached to the valve needle and by a closure element secured in a fluid-tight manner in the second hollow valve body portion on the inlet end, and the inlet opening in the closure element is implemented in the form of at least one axial through-hole.

2. The valve as recited in claim 1, wherein one of a gas filling or a vacuum is present in the elastic hollow body.

3. The valve as recited in claim 2, wherein the elastic hollow body is one of a folded or corrugated bellows made of metal.

4. The valve as recited in claim 3, wherein the adapter and the closure element are each joined tightly with an integral bond to the bellows.

5. The valve as recited in claim 3, wherein a hydraulic diameter of the bellows and a diameter of the valve seat are at least approximately equal in size.

6. The valve as recited in claim 3, wherein the second hollow valve body portion on the inlet end is molded to form a connecting piece insertable into a connecting cup for the fluid supply.

* * * * *